(12) United States Patent
Ambartsoumian

(10) Patent No.: US 11,714,033 B2
(45) Date of Patent: Aug. 1, 2023

(54) TISSUE EMBEDDING CASSETTE WITH SHIELD

(71) Applicant: Gourgen Ambartsoumian, Laval (CA)

(72) Inventor: Gourgen Ambartsoumian, Laval (CA)

(*) Notice: Subject to any disclaimer, the term of this patent is extended or adjusted under 35 U.S.C. 154(b) by 0 days.

(21) Appl. No.: 17/603,142

(22) PCT Filed: Apr. 9, 2020

(86) PCT No.: PCT/CA2020/050471
§ 371 (c)(1),
(2) Date: Oct. 12, 2021

(87) PCT Pub. No.: WO2020/206545
PCT Pub. Date: Oct. 15, 2020

(65) Prior Publication Data
US 2022/0090999 A1    Mar. 24, 2022

Related U.S. Application Data

(60) Provisional application No. 62/833,198, filed on Apr. 12, 2019.

(51) Int. Cl.
*G01N 1/36* (2006.01)
(52) U.S. Cl.
CPC ..................... *G01N 1/36* (2013.01)
(58) Field of Classification Search
None
See application file for complete search history.

(56) References Cited

U.S. PATENT DOCUMENTS

| 4,893,424 A | * | 1/1990 | McLean | G01N 1/36 264/158 |
| 6,796,427 B2 | * | 9/2004 | Kiso | G03B 17/26 206/387.1 |
| 6,937,330 B2 | * | 8/2005 | Dietz | B01L 9/527 356/244 |

(Continued)

FOREIGN PATENT DOCUMENTS

| CA | 2566024 A1 | 5/2007 |
| CA | 2994393 A1 | 2/2017 |

(Continued)

OTHER PUBLICATIONS

International Search Report and Written Opinion of the Office of Earlier Examination (Canadian Intellectual Property Office) dated Jun. 19, 2020 for PCT/CA2020/050471.

*Primary Examiner* — Jyoti Nagpaul
(74) *Attorney, Agent, or Firm* — Norton Rose Fulbright Canada LLP

(57) ABSTRACT

A tissue embedding cassette has a box defining an inner cavity. A shield has a transparent plate body, the shield for being applied against a surface of the box. Complementary connectors for the shield to be held against the surface of the box. An assembly for a tissue embedding cassette of the type having a box defining an inner cavity may include a lid adapted to be operatively connected to the box, the lid opening and closing access to the inner cavity of the box. A shield has a transparent plate body, the shield configured for being applied against a surface of the box. Complementary connectors on the lid and/or the shield, for the shield to be held against the surface of the box.

16 Claims, 13 Drawing Sheets

(56) References Cited

U.S. PATENT DOCUMENTS

| | | |
|---|---|---|
| 9,389,154 B2 | 7/2016 | Knorr et al. |
| 2010/0050888 A1 | 3/2010 | Fujimoto et al. |
| 2011/0150723 A1* | 6/2011 | Fujimoto ................. G01N 1/36 |
| | | 422/536 |
| 2012/0144657 A1 | 6/2012 | Nietfeld |
| 2013/0022518 A1 | 1/2013 | Park et al. |

FOREIGN PATENT DOCUMENTS

| | | | |
|---|---|---|---|
| EP | 0312109 A2 | | 4/1989 |
| JP | 2008JP-299293 | * | 6/2010 |
| JP | 2019020202 A | | 2/2019 |

* cited by examiner

TISSUE EMBEDDING CASSETTE WITH SHIELD

CROSS-REFERENCE TO RELATED APPLICATION

The application claims the priority of U.S. patent application Ser. No. 62/833,198, filed on Apr. 12, 2019, incorporated herein by reference.

TECHNICAL FIELD

The application relates tissue processing and embedding cassettes of the type used in pathology, cytology, histology.

BACKGROUND

Tissue processing cassettes, also known as tissue embedding cassettes, are regularly used in pathology, cytology and histology labs and other labs for tissue sample fixation and processing for microscopy. For example, they may be available as Simport M385, M480, M481, M482, M485, M490, M492, M507, M508, M512, M517, M521, or similar commercially available from number of vendors worldwide. In a typical procedure, excised tissue is placed in a tissue embedding cassette for processing, starting with fixation. Fixation is used to preserve tissues and is usually carried out immediately or rapidly after the removal of the tissue to avoid tissue degradation. Once fixed, the tissue requires processing to convert it into a form that can be cut into thin microscopic sections, for instance by dehydration and clearing. Once processed, the tissue may be embedded in a substrate, such as paraffin wax, for the subsequent cutting of sections.

In an embodiment, dehydration of tissues may be achieved using an alcohol gradient in excess of 70%. Once the tissue is dehydrated, it may be cleared by removing the dehydrant with a compound that is also mixable with the paraffin which is used for embedding. Common clearing agent are solvents, such as xylene, toluene, limonene or others including substitutes for various solvents. There consequently is a difficulty in identifying and/or labelling tissue embedding cassettes, due to the effect of solvents on various label components including inks, facestocks, coatings, varnishes laminates and/or adhesives. As tissue embedding may be performed with large volumes of specimens and may employ numerous cassettes, the identifying of cassettes is an issue.

SUMMARY

In a first aspect, there is provided a tissue embedding cassette comprising: a box defining an inner cavity; a shield having a transparent plate body, the shield for being applied against a surface of the box; and complementary connectors for the shield to be held against the surface of the box.

Further in accordance with the first aspect, for instance, a lid may be operatively connected to the box, the lid opening and closing access to the inner cavity.

Still further in accordance with the first aspect, for instance, the shield is connected to the lid.

Still further in accordance with the first aspect, for instance, the shield and the lid are monoblock.

Still further in accordance with the first aspect, for instance, the shield and the lid are made of different materials or made of a same material.

Still further in accordance with the first aspect, for instance, the shield is pivotally connected to the lid.

Still further in accordance with the first aspect, for instance, the shield is rigidly connected to the lid.

Still further in accordance with the first aspect, for instance, an angle between the shield and the lid is sharper than an angle between a top of the box and the surface of the box against which the shield is applied.

Still further in accordance with the first aspect, for instance, the surface of the box against which the shield is applied is a slanted surface.

Still further in accordance with the first aspect, for instance, the complementary connectors are located at least between the lid and the box.

Still further in accordance with the first aspect, for instance, the complementary connectors include a pivot joint between the lid and the box.

Still further in accordance with the first aspect, for instance, the complementary connectors are located at least between the shield and the box.

Still further in accordance with the first aspect, for instance, the complementary connectors selected from living hinge, snap-fit connections, latches, hinges, clips, catches, interlockings, slidings, grabber and/or grooves.

Still further in accordance with the first aspect, for instance, the shield defines a pocket configured to receive a label or tag.

Still further in accordance with the first aspect, for instance, a label or tag may be protected by the shield.

Still further in accordance with the first aspect, for instance, the tag includes an electronic chip for wireless communication.

In accordance with a second aspect, there is provided a tissue embedding cassette comprising: a box defining an inner cavity; a lid operatively connected to the box, the lid opening and closing access to the inner cavity; retaining fingers projecting from the lid and for being applied against a surface of the box; and complementary connectors for the retaining fingers to be held against the surface of the box.

Further in accordance with the second aspect, for instance, the lid and the retaining fingers are monoblock.

Still further in accordance with the second aspect, for instance, the lid and the retaining fingers are made of different materials or made of a same material.

Still further in accordance with the second aspect, for instance, an angle between the retaining fingers and the lid is sharper than an angle between a top of the box and the surface of the box against which the shield is applied.

Still further in accordance with the second aspect, for instance, the surface of the box against which the fingers are applied is a slanted surface.

Still further in accordance with the second aspect, for instance, the complementary connectors are located at least between the lid and the box.

Still further in accordance with the second aspect, for instance, the complementary connectors include a pivot joint between the lid and the box.

Still further in accordance with the second aspect, for instance, the complementary connectors are located at least between the retaining fingers and the box.

Still further in accordance with the second aspect, for instance, the complementary connectors selected from living hinge, snap-fit connections, latches, hinges, clips, catches, interlockings, slidings, grabber clips and/or grooves.

Still further in accordance with the second aspect, for instance, a label or tag may be protected by the retaining fingers.

Still further in accordance with the second aspect, for instance, the tag includes an electronic chip for wireless communication.

Still further in accordance with the second aspect, for instance, the box and the lid are monoblock, and the complementary connectors include a living hinge between the box and the lid.

In accordance with a third aspect of the present disclosure, there is provided a tissue embedding cassette comprising: a box defining an inner cavity; a lid operatively connected to the box, the lid opening and closing access to the inner cavity; retaining frame projecting from the lid and for being applied against a surface of the box; and complementary connectors for the retaining frame to be held against the surface of the box.

Further in accordance with the third aspect, for instance, the lid and the retaining frame are monoblock.

Still further in accordance with the third aspect, for instance, the lid and the retaining frame are made of different materials or made of a same material.

Still further in accordance with the third aspect, for instance, an angle between the retaining frame and the lid is sharper than an angle between a top of the box and the surface of the box against which the shield is applied.

Still further in accordance with the third aspect, for instance, the surface of the box against which the retaining frame is applied is a slanted surface.

Still further in accordance with the third aspect, for instance, the complementary connectors are located at least between the lid and the box.

Still further in accordance with the third aspect, for instance, the complementary connectors include a pivot joint between the lid and the box.

Still further in accordance with the third aspect, for instance, the complementary connectors are located at least between the retaining frame and the box.

Still further in accordance with the third aspect, for instance, the complementary connectors selected from a living hinge, snap-fit connections, latches, hinges, clips, catches, interlockings, slidings, grabber clips and/or grooves.

Still further in accordance with the third aspect, for instance, a label or tag may be protected by the shield.

Still further in accordance with the third aspect, for instance, the tag includes an electronic chip for wireless communication.

Still further in accordance with the third aspect, for instance, the box and the lid are monoblock, and the complementary connectors include a living hinge between the box and the lid.

In accordance with a fourth aspect, there is provided an assembly for a tissue embedding cassette of the type having a box defining an inner cavity, the assembly comprising: a lid adapted to be operatively connected to the box, the lid opening and closing access to the inner cavity of the box; a shield having a transparent plate body, the shield configured for being applied against a surface of the box; and complementary connectors on the lid and/or the shield, for the shield to be held against the surface of the box.

Further in accordance with the third aspect, for instance, the shield is rigidly connected to the lid.

Still further in accordance with the third aspect, for instance, the shield is pivotally connected to the lid.

Still further in accordance with the third aspect, for instance, an angle between the shield and the lid is sharper than an angle between a top of the box and the surface of the box against which the shield is applied.

Still further in accordance with the third aspect, for instance, the complementary connectors include a pivot joint for connecting the lid to the box.

Still further in accordance with the third aspect, for instance, the complementary connectors selected from living hinge, snap-fit connections, latches, hinges, clips, catches, interlockings, slidings, grabber and/or grooves.

Still further in accordance with the third aspect, for instance, the shield defines a pocket configured to receive a label or tag.

In accordance with a fourth aspect, there is provided an assembly for a tissue embedding cassette of the type having a box defining an inner cavity, the assembly comprising: a lid adapted to be operatively connected to the box, the lid opening and closing access to the inner cavity of the box; retaining fingers projecting from the lid and configured for being applied against a surface of the box; and complementary connectors on the lid and/or the retaining fingers, for the retaining fingers to be held against the surface of the box.

Further in accordance with the fourth aspect, for instance, the retaining fingers and the lid are monoblock.

Still further in accordance with the fourth aspect, for instance, an angle between the retaining fingers and the lid is sharper than an angle between a top of the box and the surface of the box against which the retaining fingers are applied.

Still further in accordance with the fourth aspect, for instance, the complementary connectors include a pivot joint for connecting the lid to the box.

Still further in accordance with the fourth aspect, for instance, the complementary connectors selected from living hinge, snap-fit connections, latches, hinges, clips, catches, interlockings, slidings, grabber and/or grooves.

In accordance with a fifth aspect, there is provided an assembly for a tissue embedding cassette of the type having a box defining an inner cavity, the assembly comprising: a lid adapted to be operatively connected to the box, the lid opening and closing access to the inner cavity of the box; a retaining frame projecting from the lid and configured for being applied against a surface of the box; and complementary connectors on the lid and/or the retaining fingers, for the retaining frame to be held against the surface of the box.

Further in accordance with the fifth aspect, for instance, the retaining frame and the lid are monoblock.

Still further in accordance with the fifth aspect, for instance, an angle between the retaining frame and the lid is sharper than an angle between a top of the box and the surface of the box against which the retaining frame is applied.

Still further in accordance with the fifth aspect, for instance, the complementary connectors include a pivot joint for connecting the lid to the box.

Still further in accordance with the fifth aspect, for instance, the complementary connectors include living hinge, snap-fit connections, latches, hinges, clips, catches, interlockings, slidings, grabber and/or grooves.

In accordance with a sixth aspect, there is provided a method for shielding a label on a cassette comprising: adhering a label or tag on a surface of a tissue embedding cassette; positioning a transparent shield over the label or tag; and connecting the transparent shield to the tissue embedding cassette.

In accordance with a seventh aspect, there is provided a method for securing a label on a cassette comprising: adhering a label or tag on a surface of a tissue embedding cassette; positioning a frame over the label or tag for an opening of the frame to be expose a center of the label or tag; and connecting the frame to the tissue embedding cassette.

DESCRIPTION OF THE DRAWINGS

Reference is now made to the accompanying figures in which.

DETAILED DESCRIPTION

Figure 1A:
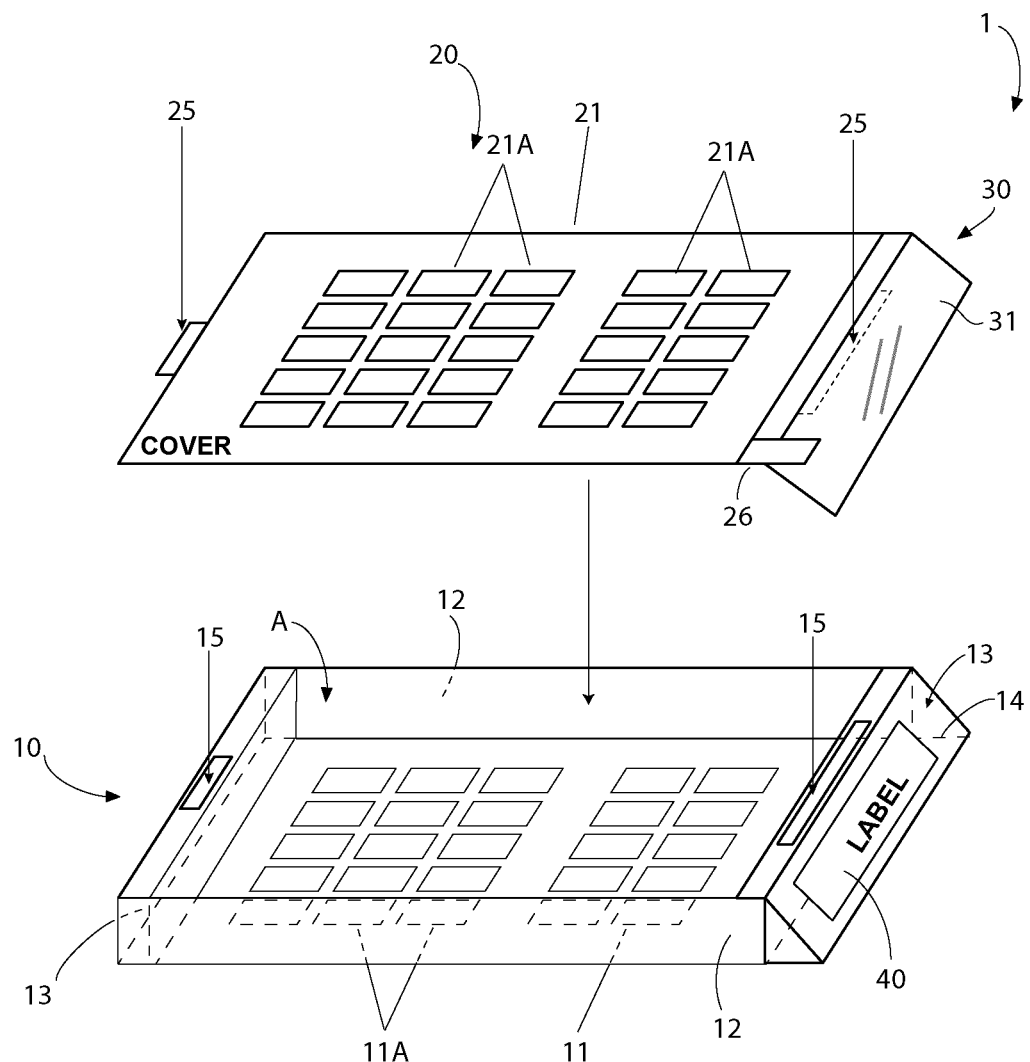
FIG. 1A is a tissue embedding cassette with shield in accordance with an embodiment of the present disclosure, the shield being integral with a lid and having a transparent plate body.

Referring to the drawings, and more particularly to FIG. 1A, a schematic tissue embedding cassette is generally shown at 1. The tissue embedding cassette 1 may also be known as a tissue processing cassette, a tissue processing embedding cassette, a slotted cassette, biopsy cassette, micro-biopsy cassette, fine mesh cassette, tissue cassette, among other names. For simplicity, the expression tissue embedding cassette will be used herein for the tissue embedding cassette 1. The tissue embedding cassette 1 is used to accommodate a tissue to be processed. After the dehydrated tissue sample is fixed/processed, it needs to be infiltrated with an embedding agent, such as paraffin wax, paraplast, etc. The embedding agents are available in different hardnesses depending on the plasticizers in the formulation. Tissue samples are then placed into an embedding mold of appropriate size and a molten embedding agent, such as molten paraffin, is poured over it. Then, the bottom part of the cassette 1 is placed over the top of the mold filled with the embedding agent and tissue sample, and more molten embedding agent is poured onto the cassette 1. Consequently, the embedding agent fills the cassette 1 and it gets combined with the mold. Afterwards the tissue embedding molds combined with the cassettes 1 are left to solidify and the embedded tissue combined with the cassette is removed from the mold after the solidification. After the embedding is completed, the block of embedding agent with tissue may be placed in a machine called microtome for sectioning thin slices of the embedded tissue. The slices may get further processing to remove the embedding agent, for instance in a process called deparaffinizing, and for further treatment such as staining of samples for microscopy.

The tissue embedding cassette 1 may be configured to be used in at least some of the steps described above. In an example, the tissue embedding cassette 1 is dimensioned 28.5 mm×41 mm×6.7 mm (1.12"×1.61"×0.26"), but other dimensions are possible. The tissue embedding cassette 1 can generally be described as having a box 10 and a lid 20. The box 10 may be known as the cassette, a receptacle, a cage, etc. The box 10 defines inner cavity A for receiving and accommodating the tissue sample for subsequent embedding. The lid 20, also known as cover, top, etc may open or close access to the inner cavity A. When the lid 20 is locked, connected, snap-fitted, etc onto the box 10, the sample is held captive in the inner cavity A. As described hereinafter, the lid 20 may be unlocked, pivoted and/or separated from the box 10. In an embodiment, the box 10 and lid 20 may be sold separately. It is also possible to use the box 10 without the lid 20.

The box 10 may be a rectangular prism or cuboid, of relatively low profile, in an embodiment, but other shapes are possible. The box 10 may be made of a unitary monoblock body. For example, the box 10 is made of polymers or metals. For example, the box 10 is molded in a high density polymer, such as acetal polymer, polyester, polypropylene, or a thermoplastic or thermoset material. The material is selected for the box 10 to be resistant to histological solvents. In an embodiment, the box 10 may be transparent.

The box 10 may have a base panel 11. The base panel 11 may be generally flat, for example. The base panel 11 may have a matrix of slots 11A, also known as holes. The slots 11A may be rectangular in shape, in accordance with a possibility, but a variety of other shapes are possible as well. The slots 11A allow flow through for good fluid exchange and proper drainage. In an embodiment, the base panel 11 has no slots, or fewer slots. Side walls 12 may project upwardly from either side of the base panel 11, while end walls 13 may project upwardly from either end of the base panel 11. Although the expressions "side" and "end" are used, there may not necessarily be any orientation to the box 10, aside from "up" and "down". The side walls 12 and the end walls 13 concurrently define the inner cavity A. Internal separations, separators, separator walls may be inside the box 10 for processing multiple tissues simultaneously. The side walls 12 and the end walls 13 may for example be in a rectangular relation with the base panel 11. The side walls 12 and end walls 13 may be provided with slots or drainage openings, though this is not necessary. According to an embodiment, one or both of the end walls 13 has/have a slanted surface 14, though such surface 14 is not necessarily present. The slanted surface 14 may be generally flat, but in an acute angle relative to a bottom plane of the box 10, at any angle up to 90 degrees, and possibly more. The slanted surface 14 may receive information or a label thereon. Its orientation may facilitate identification of the tissue embedding cassette 1, as a user with a top down point of view may more easily the slanted surface 14.

The box 10 may be configured for locking the lid 20 thereon. For instance, connectors 15 may be provided on the top end surfaces of the end walls 13 (as shown) and/or side walls 12. The connectors 15 are shown schematically, but may be any of grooves, tongues, detents, clips, holes, fastener holes, to name a few possibilities. In an embodiment, the connector 15 is a pivot portion, by which a complementary pivot portion of the lid 20 may be pivotally connected. As another possibility, as in FIGS. 2A-2C among other examples, the pivot connection is by way of a living hinge, as the box 10 and lid 20 may be comolded for example. The living hinge is one of multiple solutions of complementary connectors. In the various embodiments described herein, the complementary connectors may be snap-fit connections, latches, hinges, clips, catches, interlockings, slidings, grabber clips and/or grooves. In such an arrangement, the lid 20 may be pivoted open.

The lid 20 may be rectangular in an embodiment, to correspond to the shape of the box 10, but other shapes are possible. The lid 20 may be made of a unitary monoblock, for example of polymers or metals. In an embodiment, the lid 20 is made of the same material as the box 10 (e.g., and be transparent as well), such as a molding in a high density polymer (e.g. polyester, polypropylene, biaxially oriented polypropylene, acetal, composite materials, co-extruded materials, etc), to be resistant to histological solvents. Alternatively, the lid 20 may be made of a different material, such as if the lid 20 is integral with a shield 30 described herein. In an embodiment, the box 10 and lid 20 are comolded, with an integrated hinge (e.g., living hinge) or like connector. The lid 20 may have a top panel 21. The top panel 21 may be generally flat, for example. The top panel 21 may or may not have a matrix of slots 21A. The slots 21A may be rectangular in shape, in accordance with a possibility, but a wide variety of other shapes are possible as well. In similar fashion to the slots 11A, the slots 21A allow flow through for good fluid exchange and proper drainage.

Complementary connectors 25 may be provided at the end edges of the top panel 21. The connectors 25 are shown schematically, but may be any of grooves, tongues, detents, clips, holes, fastener holes, to name a few possibilities. The connectors 25 are selected to be complementary to the connectors 15 on the box 10. In an embodiment, one of the connectors 25 is a pivot portion complementary to the pivot portion 15 of the box 10 (e.g., a pair of pivot 15 and hook 25, or vice-versa). A tab 26 may project from the lid 20 to facilitate detaching of the lid 20 from the box 10. Other options may be present, such as ribs on side edges, used for grasping.

The tissue embedding cassette 1 is used with various shields 30 that may protect labels and/or ink thereof, as shown in FIGS. 1A to 8. The tissue embedding cassette 1 may have different configurations in FIGS. 1A to 8, as explained hereinafter, for connection of the shields 30 thereto. However, many components of the tissue embedding cassette 1 may remain the same in the various embodiments, whereby like reference numerals will point to like elements.

Referring to FIG. 1A, the shield 30 is shown as having a transparent plate body 31. The transparent plate body 31 is made of a colourless or tinted material such as polyester, nylon, acetal, thermoplastic, thermoset materials, polymer, composite polymer(s), glass or any combination of polymeric and/or non-polymeric materials resistant to solvents used during the tissue processing procedure. Accordingly, the transparent plate body 31 is made to resist exposure to solvents using in histology or cytology procedures, etc. In the embodiment of FIG. 1A, the transparent plate body 31 is sized to have the same dimensions as the slanted surface 14 of the tissue embedding cassette 1. In an embodiment, the dimensions of the transparent plate body 31 may be less than that of the slanted surface 14, yet large enough to cover a portion of the slanted surface 14 on which information will be inscribed. In another embodiment, the dimensions of the transparent plate body 31 may be larger than that of the slanted surface 14. The shield 30 may be integrally connected to the lid 20, in such a way that the transparent plate body 31 is applied against the slanted surface 14 when the lid 20 is secured to the box 10 via the complementary connection of the connector sets 15 and 25 of the box 10 and lid 20, respectively. In an embodiment, the acute angle between the lid 20 and the shield 30 may be slightly less (i.e., sharper) than an angle between a top of plane of the box 10 and the slanted surface 14, such that an elastic deformation occurs when the assembly of the lid 20 and shield 30 is secured to the box 10. The elastic deformation may result in the shield 30 applying a pressure on the slanted surface 14, which pressure prevents and/or reduces the risk of penetration of liquids between the slanted surface 14 and the shield 30. The pressure may also represent a mechanical force that presses a label 40 against the surface 14, therefore keeping the label in place should the adhesive of the label 40 lose some adhesion capacity through exposure to solvents. The shield 30 holds the label 40 captive during the tissue processing in case of a failure of the adhesive or possible erasing of the printed information. In an embodiment, the label 40 comprises a RFID (Radio Frequency Identification) tag, or item 40 is an RFID tag adhered to the cassette 10 via adhesive, and the protective shield 30 holds it captive in case of the adhesive failure. RFID is one active tracking technology, and others may also include NFC (Near Field Communication) tags or any wireless communication capable tag or device or electronic component that may be part of the label 40 or that may be used instead of the label 40. A tab may project from the shield 30, to facilitate removal of the lid 20/shield 30 from assembly to the box 10.

Consequently, a user may see through the transparent plate body 31, to read the information on label 40. The label 40 may be any type of label, such as one with a facestock supporting an adhesive layer. As an embodiment the label 40 has an adhesive layer and may be attached to the cassette 1 via the adhesive. In yet another embodiment the label 40 does not comprise any adhesive and is held to a cassette 1 by its insertion inside the pocket 31B of FIG. 3. In another embodiment the label or tag 40 is printed using a thermal-transfer printer and/or barcode printer using an inked ribbon. In yet another embodiment, the label/tag 40 is printed using an inkjet printer. In another embodiment the label 40 is printed using ink from any printing device or inscribed using a writing instrument such as a permanent marker. In another embodiment the label/tag 40 is printed using a direct-thermal printer where the ink is incorporated inside the material or a material layer and released as a result of exposure to heat generated from a thermal printing head. In another embodiment, the ink on the label/tag 40 is resistant to immersion into a solvent such as xylene for at least 5 minutes. In another embodiment, the ink on the label/tag 40 is resistant to crockmeter test of 5 strokes under 9 Newtons of pressure while it is wet with fully concentrated xylene. In an embodiment, there is no label 40, with the information embedded directly in the transparent plate body 31. The information may for example not be tissue specific, but may have a code that can be recorded in relation to the tissue. The label 40 may also include an electronic component or chip, with the examples of the label 40 being a radio frequency (RF) or a near-field communication (NFC) identification tag as detailed above.

Figure 1B:
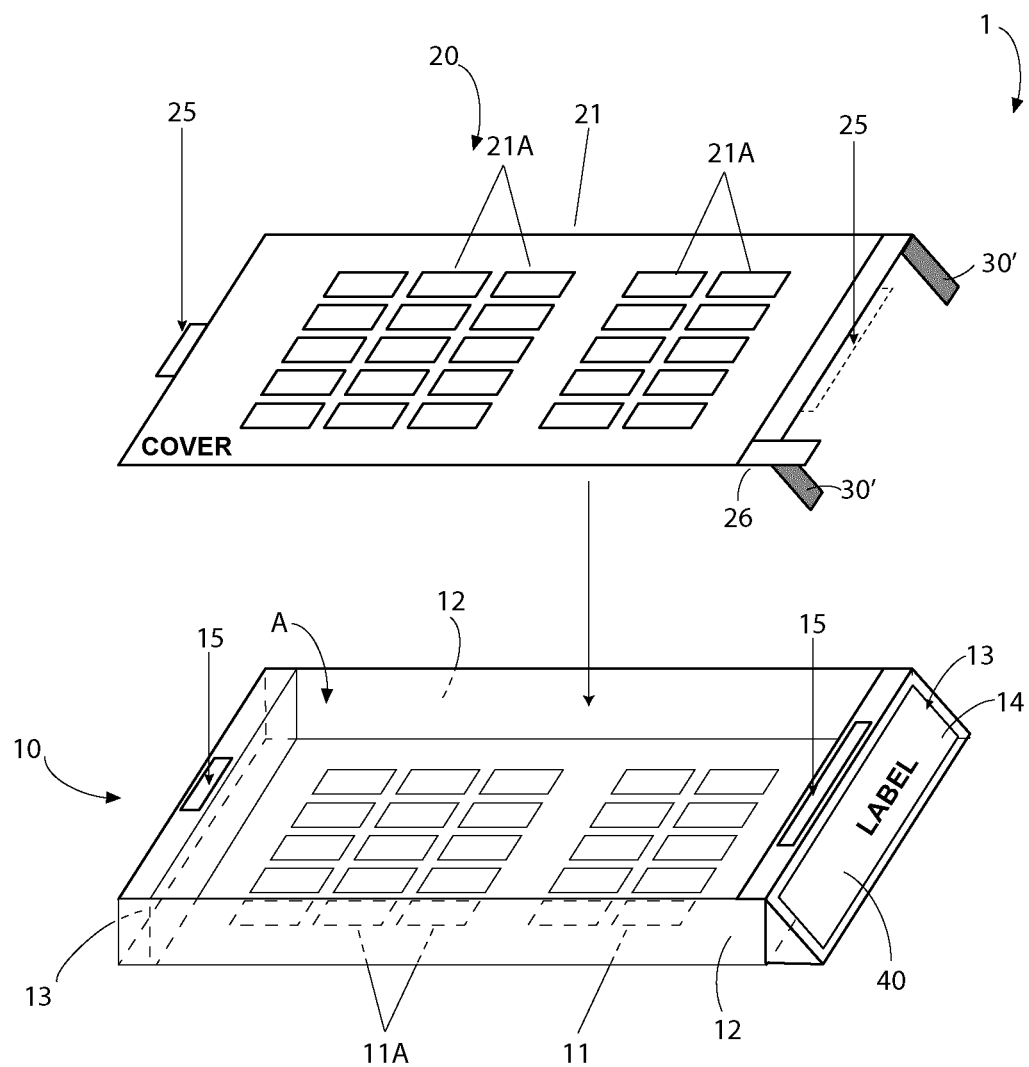
FIG. 1B is a tissue embedding cassette with shield in accordance with an embodiment of the present disclosure, having a pair of retaining fingers.

Referring to FIG. 1B, another embodiment is shown in the form of retaining fingers 30'. The retaining fingers 30' may apply a pressure to opposite sides of the label 40. The pressure represents a mechanical force that presses the label 40 against the surface 14, therefore keeping the label in place should the adhesive of the label 40 lose some adhesion capacity through exposure to solvents. The retaining fingers 30' may be spaced apart so as to cover the side edges of the label 40. The spacing is such that data inscribed on the label 40 may be viewable between the fingers 30'. The retaining fingers 30' may be made from the same or from a different material than that of the cover 20. In an embodiment, the fingers 30' are monoblock with the cover 20, i.e., molded therewith. In another embodiment the entire cassette 1, including the box 10, the cover 20 and the fingers 30' are monoblock and molded together. In another embodiment the box 10, the cover 20 and the fingers 30' are made from a non-transparent material since the information is visible on the label trapped between the fingers 30'. The fingers 30' may have similar characteristics as the shield 30, notably in terms of the elastic deformation and sharper angle, for the fingers 30' to apply suitable force. Connectors 35 may be at the bottom of the fingers 30' for example, or elsewhere such as on the sides, for the retaining fingers 30' to clip to the box 10.

Figure 1C:
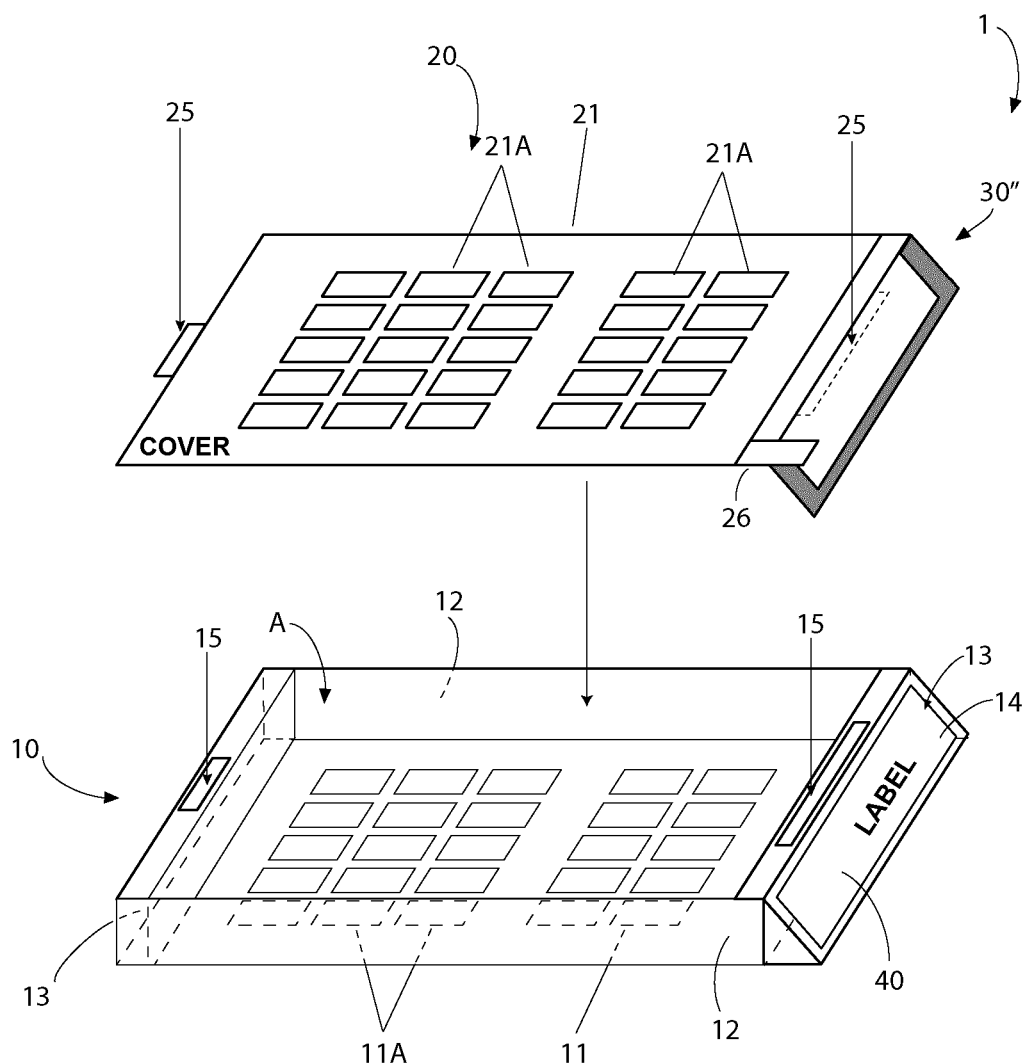
FIG. 1C is a tissue embedding cassette with shield in accordance with an embodiment of the present disclosure, having a retaining frame.

Referring to FIG. 1C, another embodiment is shown in the form of a retaining frame 30", a.k.a., retaining window. Like the retaining fingers 30', the retaining frame 30" may apply a pressure to opposite sides of the label 40, and also on the bottom edge and possibly on the top edge. The pressure represents a mechanical force that presses the label 40 against the surface 14, therefore keeping the label 40 in place should the adhesive of the label 40 lose some adhesion capacity through exposure to solvents. The retaining frame 30" may be spaced apart so as to cover the side edges and/or the bottom edge and/or the top edge of the label 40, and form a window frame around the label 40. The spacing is such that data inscribed on the label 40 may be viewable within the frame 30". The retaining frame 30" may be made from the same or from a different material than that of the cover 20. In an embodiment, the frame 30" is monoblock with the cover 20, i.e., molded therewith. In another embodiment the entire cassette 1, including the box 10, the cover 20 and the frame 30" are monoblock and molded together (co-molded). In another embodiment the box 10, the cover 20 and the frame 30" are made from a non-transparent material since the information is visible on the label 40 trapped between the edges of the frame 30". The frame 30" may have similar characteristics as the shield 30, notably in terms of the elastic deformation and sharper angle, for the frame 30" to apply suitable force. Connectors 35 may be at the bottom of the frame 30" for example, or elsewhere such as on the sides, for the frame 30" to clip to the box 10.

Figure 2A:
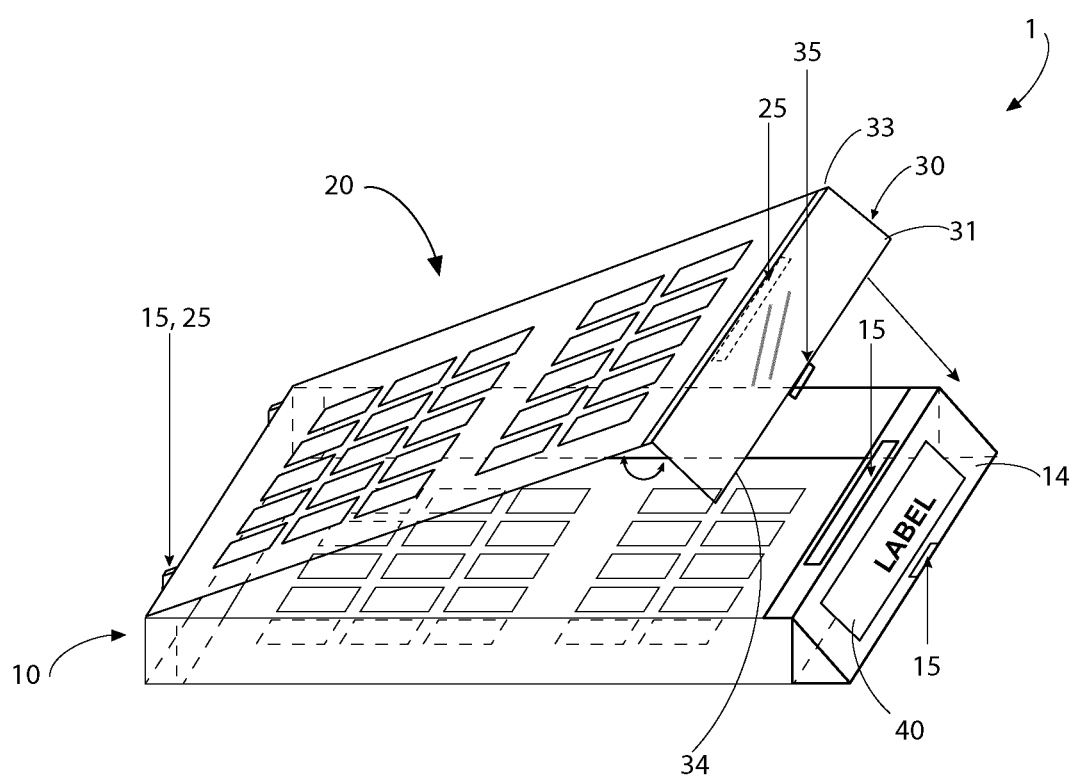
FIG. 2A is a tissue embedding cassette with shield in accordance with another embodiment of the present disclosure, the shield being hinged to the lid and having a transparent plate body.
Figure 2B:
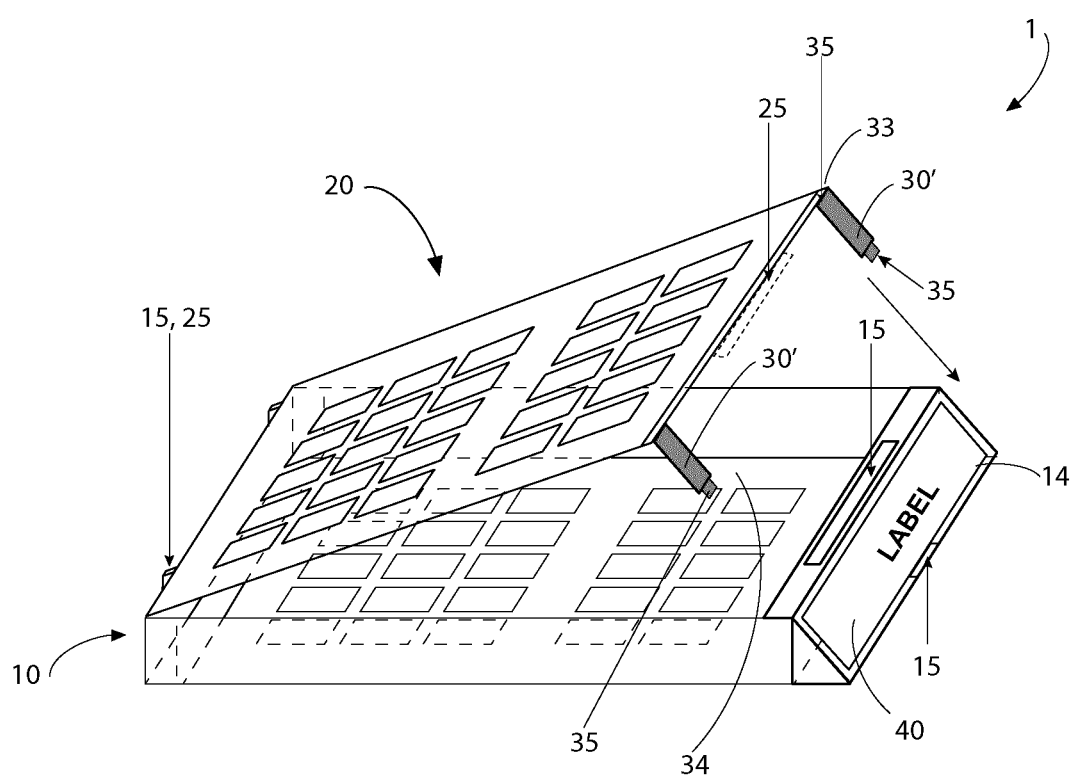
FIG. 2B is a tissue embedding cassette with shield in accordance with another embodiment of the present disclosure, having a pair of retaining fingers.
Figure 2C:
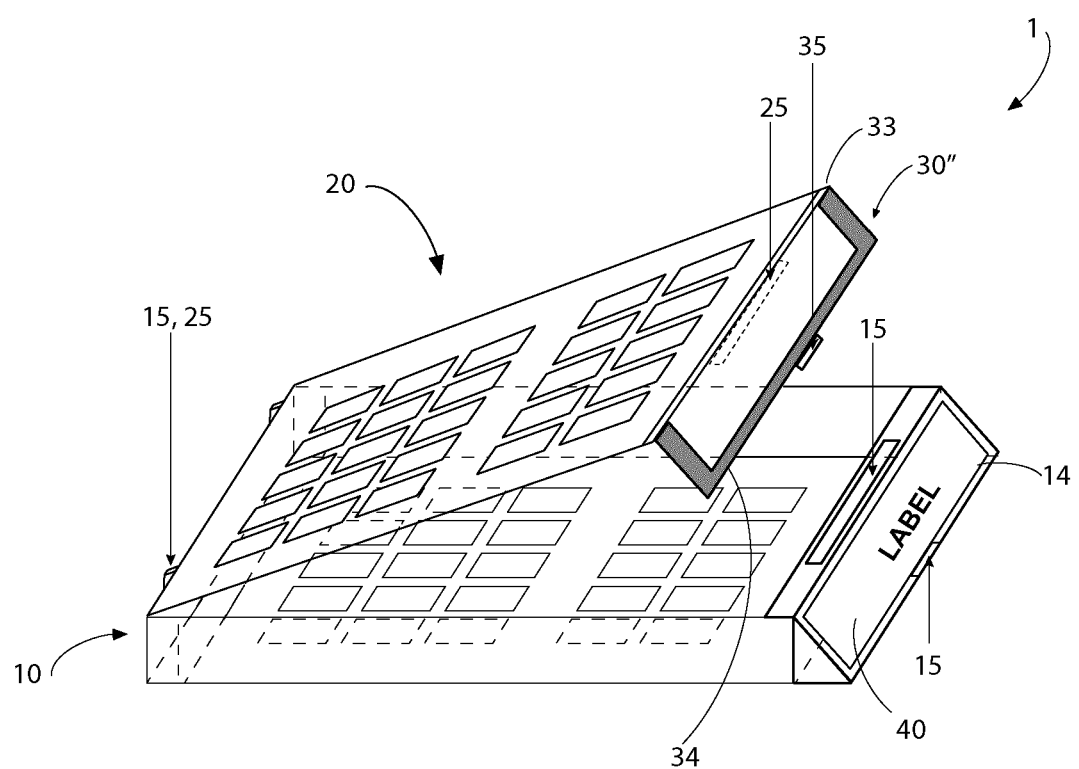
FIG. 2C is a tissue embedding cassette with shield in accordance with another embodiment of the present disclosure, having a retaining frame.

Referring to FIG. 2A, the shield 30 may be rigidly attached to the lid 20, or connected to lid 20 via hinge 33, with other connectors such as 35 assisting in clamping the shield 30 to the box 10. In such an embodiment, the box 10 and the lid 20 are hinged to one another by the complementary connectors 15 and 25 (e.g., pivot and hook), at a rear end of the box 10. A bottom edge 34 of the transparent plate body 31 may be provided with a connector 35, to connect to a complementary connector 15 of the box 10. The complementary set of connectors 15 and 35 may be a tab and slot, tongue and groove, etc. In an embodiment, the cooperation of the set of connectors 15 and 35 results in the shield 30 applying a pressure on the slanted surface 14, again to prevent and/or reduce the risk of penetration of liquids between the slanted surface 14 and the shield 30 and in case of penetration of liquids the pressure of the lid 20 physically secures the label 40 in place during the tissue processing. The embodiment of FIG. 2A may be extended to the retaining fingers 30' as in FIG. 2B and/or to the retaining frame 30" as in FIG. 2C.

Figure 3A:
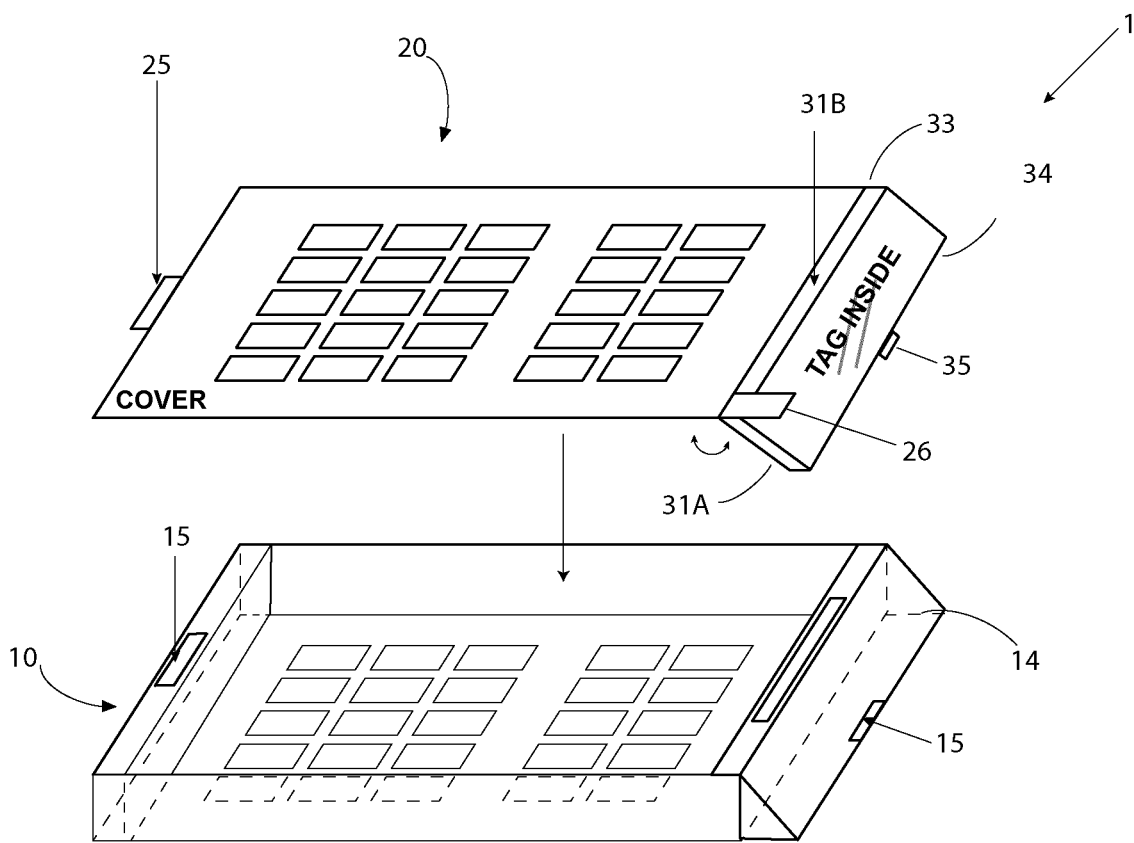
FIG. 3A is a tissue embedding cassette with shield in accordance with another embodiment of the present disclosure, the shield having a pocket.
Figure 3B:
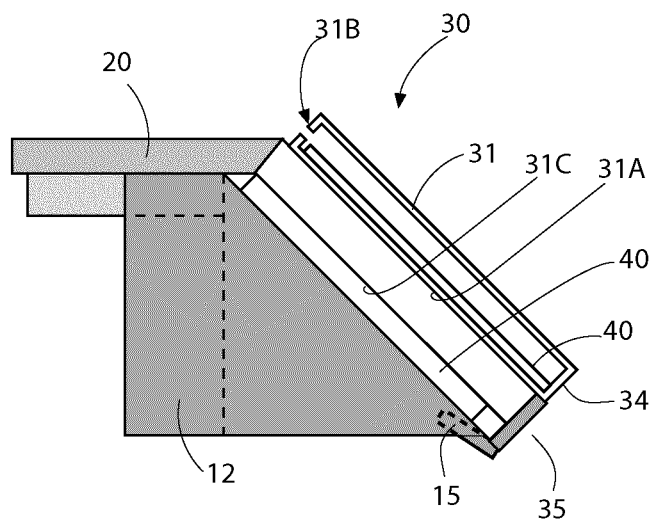
FIG. 3B is a tissue embedding cassette with shield of the type shown in FIG. 3A, with a receptacle in the shield in addition to the pocket.

Referring to FIG. 3A, a similar arrangement is shown as in FIG. 2A. However, the transparent plate body 31 is connected to another panel body 31A, in such a way that a pocket 31B is formed therebetween. The pocket 31B may be narrow enough for label 40 (with or without support liner) to be slid in. Inverted edges of the pocket 31B may present an obstruction against the removal of the label 40. In such an embodiment, the shield 30 may be with connectors 35 or may have other type of connector(s) or mechanism to securely lock the cassette, such as if the connector 25 of the lid 20 is present. The panel body 31A may or may not be transparent. In an embodiment, a strip, flap or seal may form a barrier at the top of the pocket 31B to prevent exit of the label 40 from the pocket 31B. Moreover, the panel body 31A may also form a receptacle 31C with the slanted surface 14, as shown in FIG. 3B. In an embodiment, the receptacle 31C may receive another type of label 40 or identification means, such as an electronic chip that does not need to be seen.

Figure 4A:
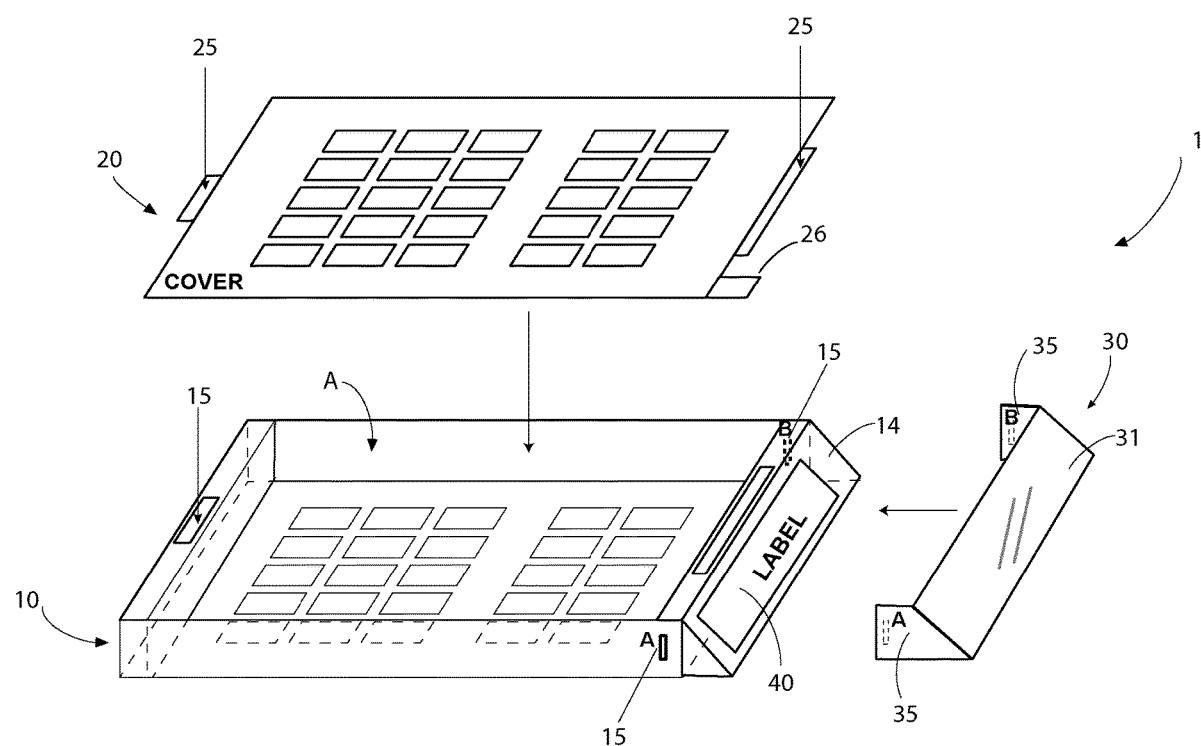
FIG. 4A is a tissue embedding cassette with shield in accordance with another embodiment of the present disclosure, with the transparent plate shield attachable to a box of the tissue embedding cassette.
Figure 4B:
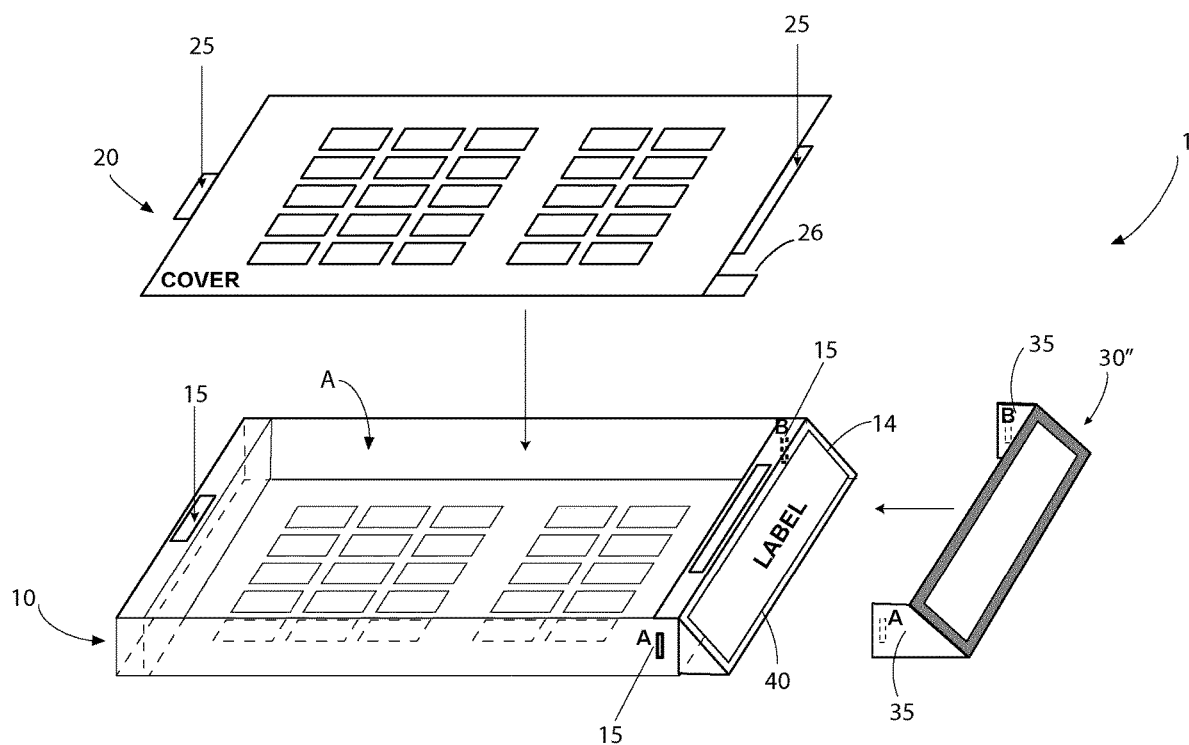
FIG. 4B is a tissue embedding cassette with shield in accordance with another embodiment of the present disclosure, with a retaining frame attachable to a box of the tissue embedding cassette.

Referring to FIG. 4A, the shield 30 is not integrally connected to the lid 20 (i.e., they may be separated). The connectors 35 may be snap clips, snap fits, snap-locks, male/female type of locks, tabs, fingers, gliding or sliding groove, etc, that cooperate with complementary connectors 15 on the side walls 12 of the box 10. The complementary connectors 15 may be side slots or grooves defined in the side walls 12, so as to receive the connectors 35 or any other locking or snapping mechanism. In an embodiment, the lid 20 in the FIG. 4A may be connected to the box 10 and produced as one piece. The embodiment of FIG. 2A may be extended to the retaining frame 30" as in FIG. 2C.

Figure 5:
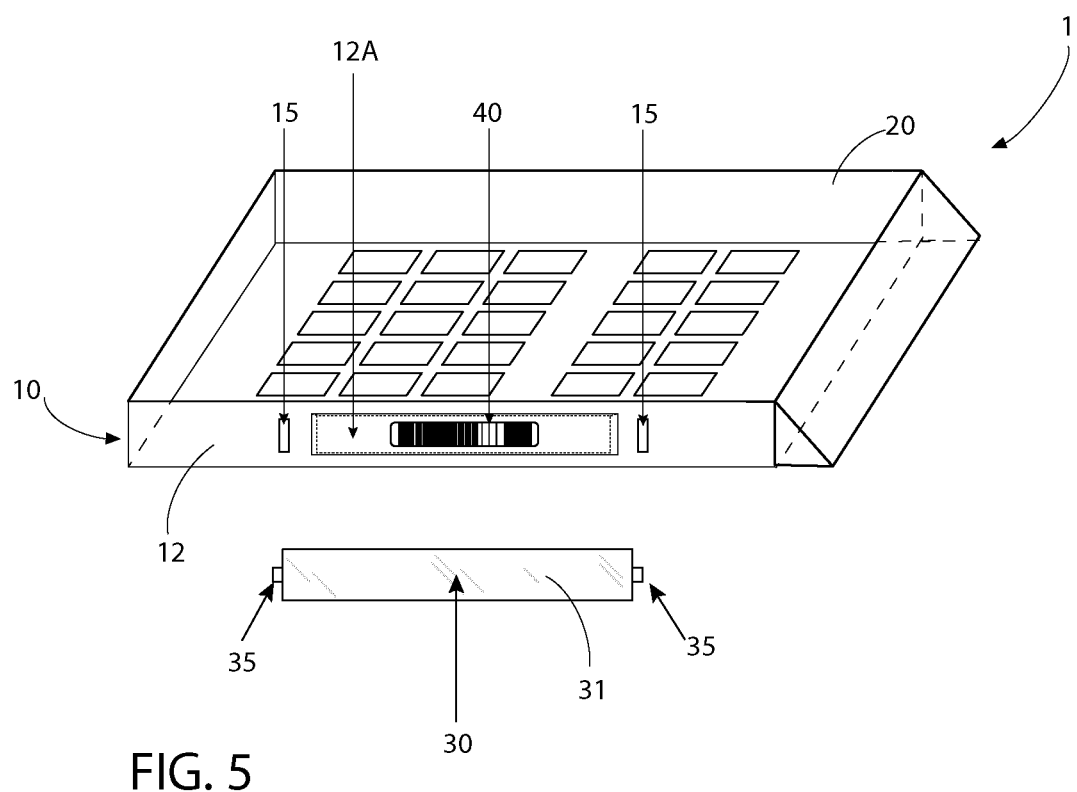
FIG. 5 is a tissue embedding cassette with shield in accordance with another embodiment of the present disclosure, with the shield in an indentation of a side wall of the box.

Referring to FIG. 5, the shield 30 may also apply against one or both or any of the side walls 12 or on the straight end wall 13 (i.e., the one without the slanted surface 14). The shield 30 also has the transparent plate body 31. In an embodiment, the transparent plate body 31 is shaped as an elongated strip received in an indented slot 12A of corresponding size in the side wall 12 or in the straight end wall 13. The indented slot 12A receives the label 40 (including electronic tag) or ink, to then be covered by the transparent plate body 31. The connectors 35 may be snap clips, tabs, fingers, etc, that cooperate with complementary connectors 15 on the side walls 12 of the box 10. The complementary connectors 15 may be side slots defined in the side walls 12, so as to receive the connectors 35. In an embodiment, the shield 30 in the format of FIG. 5 can be used on the slanted surface 14 as an alternative to the arrangements shown in in some of FIGS. 1A-4.

Figure 6:
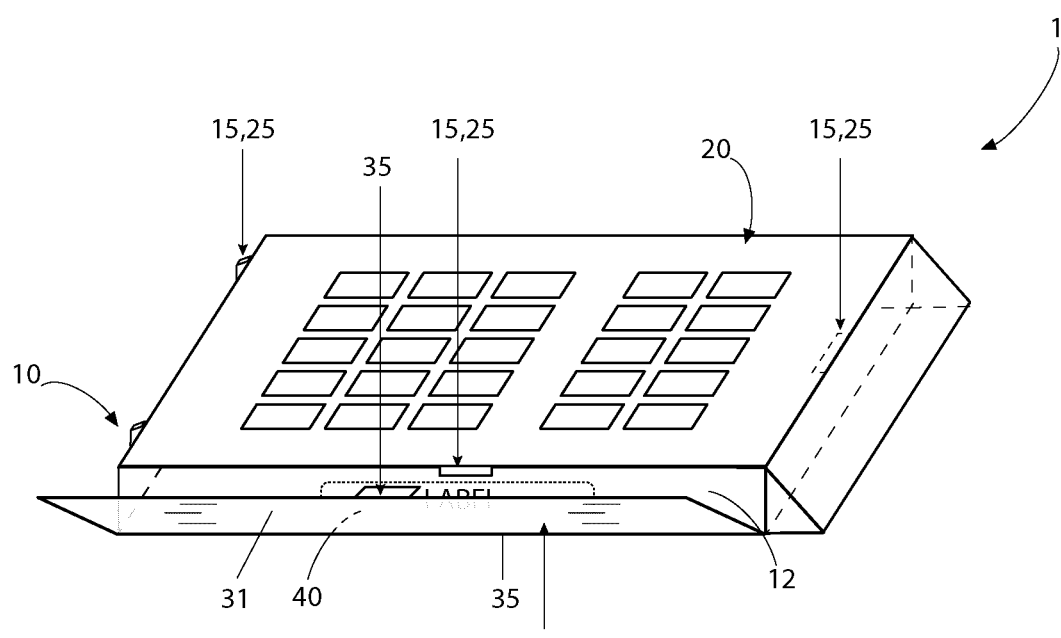
FIG. 6 is a tissue embedding cassette with shield in accordance with another embodiment of the present disclosure, with the shield attached to the box.
Figure 7:
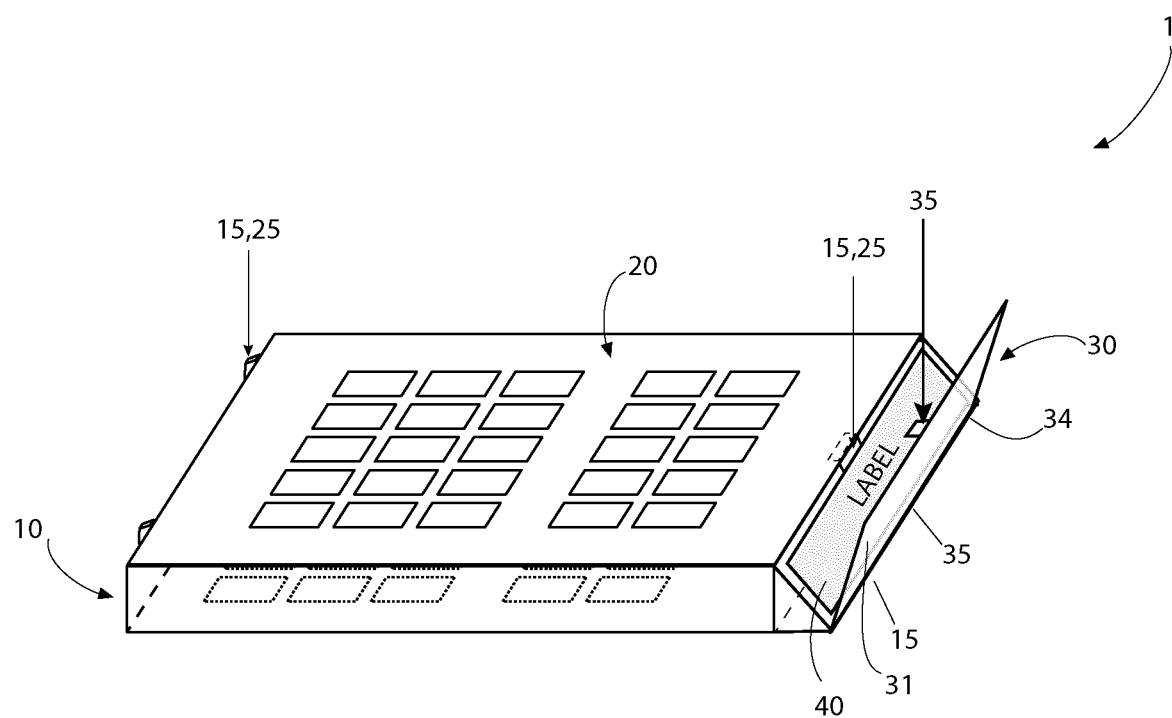
FIG. 7 is a tissue embedding cassette with shield in accordance with another embodiment of the present disclosure, with the shield attached to the box.
Figure 8:
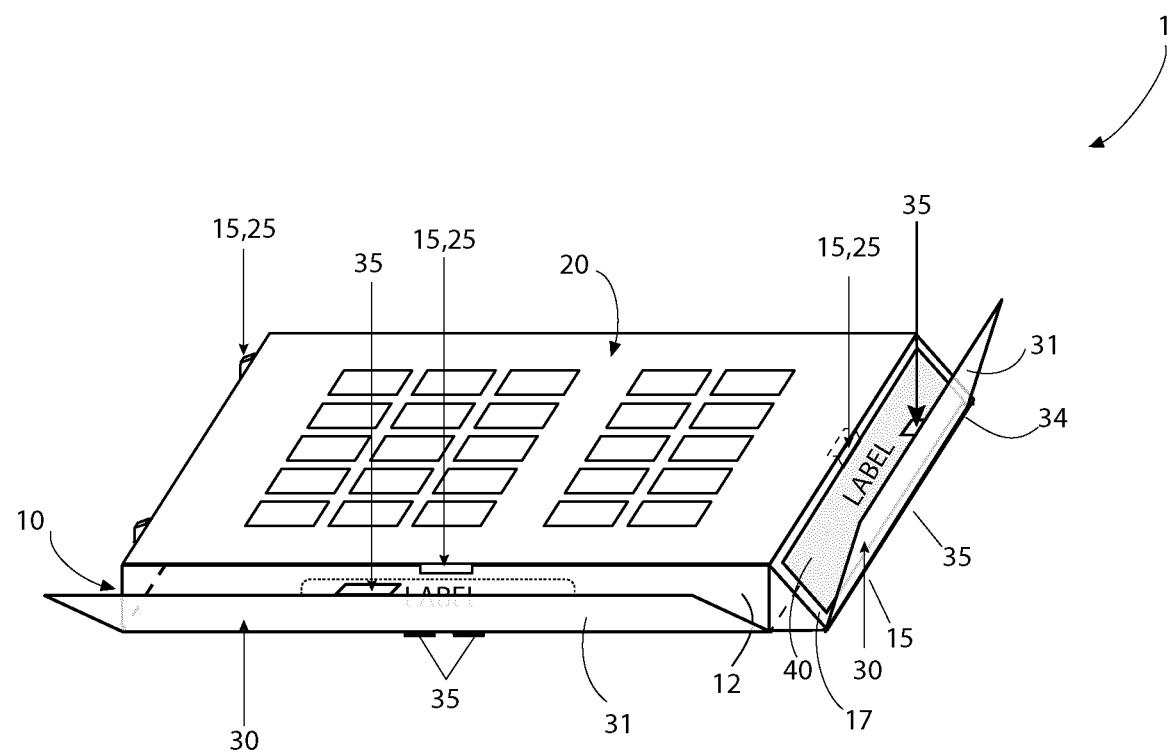
FIG. 8 is a tissue embedding cassette with shield in accordance with another embodiment of the present disclosure, with shields attached to the box.

Referring to FIGS. 6 and 7, an embodiment of the shield 30 similar to that of FIG. 5 is shown, but with the transparent plate body 31 covering the side wall 12, the straight end wall 13, and/or the slanted surface 14 from top to bottom. The side wall 12, the straight end wall 13 and/or the slanted surface 14 may be with or without the indented slot 12A. In such an embodiment, the connectors 35 of the shield 30 may be located at opposite edges of the transparent plate body 31, e.g., at the top and bottom edges or on the side edges, with the complementary connectors 15 at the appropriate locations on the box 10. The embodiment of FIG. 8 combines two shields 30, i.e., one for the side wall 12 and one for the slanted surface 14. In some of the embodiments shown in FIGS. 6-8, the transparent shield(s) 30 may be connected integrally with the walls 12, back wall 13 or slanted surface 14 or provided as a separate piece(s) that can be connected to the side walls 12, back wall 13 or slanted surface 14 through any type of connector or mechanism.

Consequently, in some embodiments, a user can apply a label on a receiving surface, such as the slanted surface 14 in FIG. 1A. In some embodiments, once the lid 20 is closed upon the box 10, the transparent plate body 31 snaps and locks the label 40 underneath. As a result the pressure from the transparent plate body 31 may put a physical pressure on the label 40 and keep it in place during the processing.

Since the transparent plate body 31 is transparent, information on the label 40, on the protected surface of the box 10 or lid 20, (e.g., 1D or 2D bar code) or any other information may be visible for scan manually or by any automation device. Many designs are possible as long as the transparent shield 30 covers the label 40 and keeps it in place throughout the tissue processing inside the tissue embedding cassette 1 allowing the information to be visible and/or readable.

The shield(s) 30 may come as a kit with one or more of the tissue embedding cassette 1, the box 10, the lid 20 and/or boxes labels 40 (including electronic chips). In some embodiments, the box 10 and the lid 20 are integrally connected or complementary. In some embodiments, the lid 20 and the shield 30 are integrally connected, e.g., hinged, and/or complementary. In some embodiments the box 10, the lid 20 and the shield 30 are monoblock in one piece. The various components, if in kits, have compatible connectors 15, 25 and/or 35. In another embodiment, a kit may include a cassette pre-labelled with information or a barcode. In another embodiment the kit has a cassette, a shield 30 and a label 40. The cassette 10 with a shield 30, finger 30', frame 30" can be used in automation or robotic systems to process histological cassettes, including when RFID tags or labels are used.

The above description is meant to be exemplary only, and one skilled in the art will recognize that changes may be made to the embodiments described without departing from the scope of the invention disclosed. There are many varieties of cassettes 1 depending on the design of the inner cavity A (a.k.a., chambers), hole sizes and shapes. Some tissue embedding cassettes 1 have the covering lid 20 attached to the box 10 and in other types the cover lid 20 is separate from the box 10 (a.k.a., base 10). Still other modifications which fall within the scope of the present invention will be apparent to those skilled in the art, in light of a review of this disclosure, and such modifications are intended to fall within the appended claims.

In an embodiment, the cassette 1 may be subjected to a method for shielding a label thereon by: adhering a label or tag on a surface of a tissue embedding cassette; positioning a transparent shield over the label or tag; and connecting the transparent shield to the tissue embedding cassette.

In another embodiment, the cassette 1 may be subjected to a method for securing a label on a cassette by: adhering a label or tag on a surface of a tissue embedding cassette; positioning a frame over the label or tag for an opening of the frame to be expose a center of the label or tag; and connecting the frame to the tissue embedding cassette.

The invention claimed is:

1. A tissue embedding cassette comprising:
   a box defining an inner cavity, and a surface configured to receive ink and/or a label thereon, the surface being outside of the inner cavity, the box including a base panel having a matrix of holes configured to allow fluid flow through;
   a lid operatively connected to the box, the lid opening and closing access to the inner cavity;
   a shield having a transparent plate body, the shield for being applied against and cover the surface of the box, the shield being connected directly to the lid; and
   complementary connectors for the shield to be held against the surface of the box.

2. The tissue embedding cassette according to claim 1, wherein the shield and the lid are monoblock.

3. The tissue embedding cassette according to claim 1, wherein the shield and the lid are made of different materials or made of a same material.

4. The tissue embedding cassette according to claim 1, wherein the shield is pivotally connected to the lid.

5. The tissue embedding cassette according to claim 1, wherein the shield is rigidly connected to the lid.

6. The tissue embedding cassette according to claim 5, wherein an angle between the shield and the lid is sharper than an angle between a top of the box and the surface of the box against which the shield is applied.

7. The tissue embedding cassette according to claim 6, wherein the surface of the box against which the shield is applied is a slanted surface.

8. The tissue embedding cassette according to claim 1, wherein the complementary connectors are located at least between the lid and the box.

9. The tissue embedding cassette according to claim 8, wherein the complementary connectors include a pivot joint between the lid and the box.

10. The tissue embedding cassette according to claim 1, wherein the complementary connectors are located at least between the shield and the box.

11. The tissue embedding cassette according to claim 1, wherein the complementary connectors selected from living hinge, snap-fit connections, latches, hinges, clips, catches, interlockings, slidings, grabber and/or grooves.

12. The tissue embedding cassette according to claim 1, wherein the shield defines a pocket configured to receive a label or tag.

13. The tissue embedding cassette according to claim 1, further including a label or tag to be protected by the shield.

14. A tissue embedding cassette comprising:
   a box defining an inner cavity, and a surface configured to receive a label thereon, the surface being outside of the inner cavity, the box including a base panel having a matrix of holes configured to allow fluid flow through;
   a lid operatively connected to the box, the lid opening and closing access to the inner cavity;
   a retaining frame forming a window free of material, the retaining frame projecting from the lid and for being applied against the surface of the box the retaining frame applying a force on the surface, whereby the retaining frame is configured to retain a label against the surface with the label visible through the window; and complementary connectors for the retaining frame to be held against the surface of the box.

15. A tissue embedding cassette comprising:

a box defining an inner cavity, and a surface configured to receive a label thereon, the surface being outside of the inner cavity and being flat, the box including a base panel having a matrix of holes configured to allow fluid flow through;

a lid operatively connected to the box, the lid opening and closing access to the inner cavity;

retaining fingers projecting from the lid and for being applied against the surface of the box, the retaining fingers applying a force on the surface, whereby the retaining fingers are configured to retain a label against the surface; and complementary connectors for the retaining fingers to be held against the surface of the box.

16. The tissue embedding cassette according to claim 13, wherein the tag includes an electronic chip for wireless communication.

\* \* \* \* \*